United States Patent [19]

Nelson

[11] 4,186,724
[45] Feb. 5, 1980

[54] SOLAR ENERGY COLLECTOR

[75] Inventor: David H. Nelson, Arroyo Grande, Calif.

[73] Assignee: American Solar, Arroyo Grande, Calif.

[21] Appl. No.: 872,890

[22] Filed: Jan. 27, 1978

Related U.S. Application Data

[63] Continuation-in-part of Ser. No. 744,290, Nov. 22, 1976, Pat. No. 4,108,154.

[51] Int. Cl.² .................................................. F24J 3/02
[52] U.S. Cl. ...................................... 126/443; 138/110; 126/418; 126/437; 126/438; 126/446
[58] Field of Search .................... 126/271, 270, 400; 165/18; 237/1 A; 138/110

[56] References Cited

U.S. PATENT DOCUMENTS

| | | | |
|---|---|---|---|
| 338,310 | 3/1886 | Smith | 138/110 |
| 1,068,650 | 7/1913 | Harrison | 126/271 |
| 2,460,482 | 2/1949 | Abbot | 126/271 |
| 3,952,724 | 4/1976 | Pei | 126/271 |
| 3,985,119 | 10/1976 | Oakes | 126/271 |
| 4,010,732 | 3/1977 | Sawata et al. | 126/271 |
| 4,016,860 | 4/1977 | Moan | 126/270 |
| 4,059,093 | 11/1977 | Knowles et al. | 126/271 |
| 4,062,489 | 12/1977 | Henderson | 126/271 |
| 4,117,831 | 10/1978 | Bansal et al. | 126/271 |
| 4,120,285 | 10/1978 | Nugent | 126/270 |

Primary Examiner—Samuel Scott
Assistant Examiner—Daniel J. O'Connor
Attorney, Agent, or Firm—Fulwider, Patton, Rieber, Lee & Utecht

[57] ABSTRACT

A solar energy collector is provided with a conduit in which tubing carries a heat collecting fluid within an evacuated jacket that encompasses the tubing and within which the tubing is located in an insulation space. The jacket is transparent to solar radiation within a solar radiation collection portion of the device, and may be armored externally thereof about the tubing as it transports the heat collection fluid to a heat exchanger or a thermal sink.

20 Claims, 7 Drawing Figures

SOLAR ENERGY COLLECTOR

This is a continuation-in-part of U.S. Patent application Ser. No. 744,290, filed November 22, 1976, now U.S. Pat. No. 4,108,154.

FIELD OF THE INVENTION

The present invention relates to the collection and concentration of solar energy as thermal energy, and the transfer of that thermal energy by means of a heat collection fluid.

BACKGROUND OF THE INVENTION

Solar energy collection devices have been developed which are oriented to receive solar radiation and to collect and transform solar radiation to thermal energy using a circulating or recirculating heat collection fluid. The collection fluid flows to a solar radiation collection station where it is heated by the rays of direct or reflected sunlight. The fluid is pumped from the solar collection station to a heat exchanger, where the thermal energy collected is utilized. In one type of heat exchanger for use with solar collectors in which, for example, liquid sodium is the heat collection fluid, the heat exchanger may include coils carrying the liquid sodium proximately positioned to coils carrying water. In this manner the water is heated by the liquid sodium, thereby effectuating transfer of the thermal energy acquired by solar collection to the water.

Solar radiation which is entrapped as thermal energy may be used directly for the purpose of heating water. Alternatively or in addition to the use of a heat exchanger, the heat collection conduit may carry the heat collection fluid to a heat sink. The heat sink may be an insulated storage tank in some applications, such as where the heat collection fluid is water. The tank, in such instances, resembles a tank used in conventional gas or electric hot water heaters. The water heated by solar energy is dispensed from the heat sink as required for use. One embodiment of such a system provides heated water for household use or for a heated swimming pool.

Several different forms of solar energy collection systems are utilized in which a heat transfer fluid is circulated or recirculated to acquire thermal energy and to carry this energy from the solar collector for later release. The most widely used type of solar collector is the panel or flat plate collector. In this type of solar energy collection device a heat collection fluid follows a serpentine path through a tubing system lying substantially in a flat plane. A transparent sheet or membrane may be stretched across the upper surface of the collector and reflectors are sometimes located beneath distinct portions of the tubing to entrap radiation from the sun as thermal energy within the collector and to transfer the incident heat of radiation to a fluid flowing through the tubing. Another type of solar energy collector is a concentrator. In a concentrator, a highly reflective parabolic trough is directed to face the sun. A linearly aligned conduit is positioned to extend along the focal axis of the parabolic trough so that solar radiation incident to the trough is reflected to the linear conduit and is absorbed as thermal energy by a heat transfer fluid circulating therein. While numerous other types of solar energy collection devices have been developed, the flat plate collector and the concentrator are of the greatest commercial significance.

One problem present in connection with solar energy collection devices that employ a heat transfer fluid is the problem of retaining heat collected within the fluid. Once the temperature of the heat collection fluid has been raised to exceed ambient temperature, there is a tendency for the heat collection fluid to radiate thermal energy, thereby losing the solar energy that it has acquired. To compensate for this, some systems have jacketed the heat collection tubing used with a transparent vacuum jacket. The objective of such an arrangement is to allow solar radiation to pass as incident light energy through the transparent vacuum jacket to enter the fluid transfer medium. By transforming the incident solar radiation to thermal energy, rather than maintaining it in the form of light energy, outward radiation from the heat collection fluid is inhibited by the surrounding insulating vacuum. However, several defects exist in connection with this approach. One principal disadvantage of conventional systems is that oftentimes the vacuum jacket fails to maintain a good vacuum seal. This is because the transparent material, usually glass, is sealed to the fluid transfer tubing, typically formed of copper pipe with a blackened outer surface. Because of the differences in coefficients of thermal expansion between the glass jacket and the metallic tubing, the vacuum seal formed therebetween is easily broken when the device is in use. Thus, the vacuum surrounding the fluid transfer tubing is frequently lost or of such a low differential from surrounding ambient pressure that it is ineffective to adequately prevent radiation of thermal energy from the interiorally located tubing.

Another problem that has existed in connection with conventional vacuum jacketing of solar collection conduits is the positioning of the surrounding vacuum jacket in direct contact with the fluid transfer tubing. Thus, while thermal radiation from fluid within the tubing may be inhibited by the surrounding vacuum, the contact of the jacket with the tubing provides a path for conducting heat away from the fluid. That is, heat is transferred by conduction through the structure of the jacket in addition to any heat losses which may exist by virtue of radiation as a result of poor vacuum sealing.

Accordingly, it is an object of the present invention to provide a solar collection conduit which inhibits radiation loss from a heat transfer fluid within a solar energy collection device while at the same time guarding against loss of heat by conduction. This objective is achieved by surrounding the heat collection tubing with a vacuum jacket within an insulation space. This insulation space is typically filled with dead air which is prevented from circulating. Thus, to escape the heat transfer fluid, thermal energy must be conducted from the fluid to the surrounding copper tubing, and must radiate through a dead air space and subsequently through an evacuated chamber before it is lost as a source of energy. This arrangement markedly decreases thermal losses from the fluid transfer medium when contrasted with conventional devices.

A further object of the invention is to provide a conduit construction in which heat transfer fluid tubing is surrounded by an evacuated chamber which avoids vacuum seals between the fluid transfer tubing and the material of which the vacuum jacket is constructed. A vacuum jacket construction according to the present invention thereby avoids the metal-glass interfaces that are so unsatisfactory for maintaining vacuum seals and which have been so prevalent in the prior art. Rather, the present invention employs a vacuum jacket comprised of an inner glass sleeve and an outer glass sleeve. These sleeves may be of several configurations, depending upon the heat transfer fluid tubing configuration employed. Where the heat transfer fluid tubing is constructed to allow fluid to traverse from one side or end of a solar collection panel or reflector trough and to travel across the collector surface to exit at an opposite end, the vacuum jacket is preferably configured as a longitudinally elongated pair of concentric cylinders joined at either end by opposing halves of a toroidal surface. The length of the cylinders is commensurate with the length of the heat collection fluid tube sections which are surrounded thereby.

A further object of the invention is to provide a fluid transfer conduit for use in a solar energy collection system which is equipped with a vacuum chamber surrounding central fluid conducting tubing located within the interior confines of the vacuum jacket within an insulation space between the inner wall of the jacket and the fluid transfer tubing. Moreover, this heat conserving conduit is preferably protected externally of the solar radiation receiving section by armored sheathing located thereabout. Such armor sheathing may take the form of steel or copper tubing positioned to coaxially envelop the vacuum jacket. An additional vacuum layer may be provided in such an embodiment where the steel or copper tubing is itself constructed of multiple walls which define an additional evacuated area therebetween. Again, sealing between disimiliar materials is avoided, since no seal exists between the glass vacuum jacket and the surrounding metal vacuum jacket. Instead, the glass walls of the interior glass jacket are sealed together while the metal walls of the exterior metal jacket are either sealed to each other or to interface connections.

An additional object of one embodiment of the invention is a solar energy fluid transfer conduit system in which fluid transfer tubing has a transparent vacuum jacket that includes an intermediate partition between spaced inner and outer walls. The vacuum jacket is thereby divided to define a pair of concentric vacuum chambers on either side of the partition.

Another object of one embodiment of the invention is to provide a collector tube which maximizes the efficiency or reflected solar radiation collection and retention. This is achieved by providing coaxial tubes for the circulating fluid used to collect the reflected solar energy. Thus, the fluid may flow through the innermost tube from one end to other, and then back around the outside of the innermost tube within a second outer coaxial tube. Alternatively, flow may proceed in the opposite direction. In both instances heat radiated from the inner tube is absorbed by fluid in the outer tube. Thermal energy from fluid within the interior tube segment thereby radiates into a surrounding layer of heat collection fluid, thereby conserving thermal energy within the entire system.

DESCRIPTION OF THE EMBODIMENT

Figure 3:
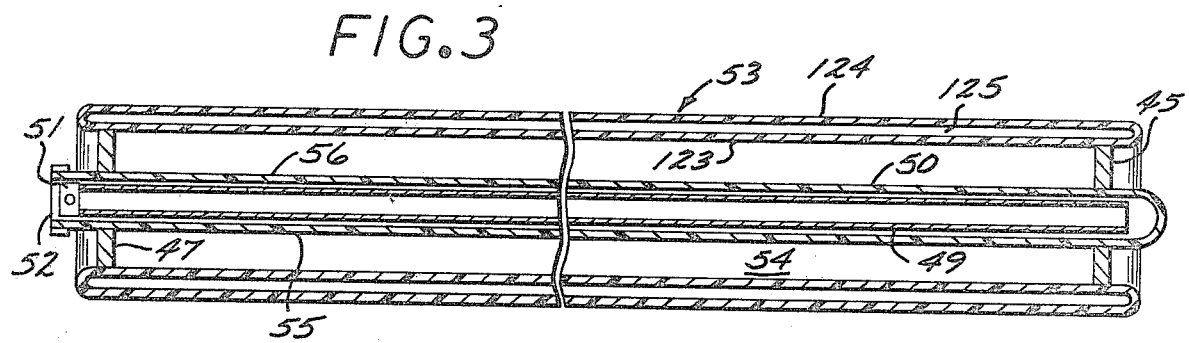
FIG. 3 is a cross sectional view of the improved conduit taken along the lines 3—3 of FIG. 1.

The improved solar collection conduit may be utilized either in association with flat plate collectors or with concentrators, as well as with other forms of solar radiation collection devices. The essential features of the invention are apparent with reference to FIGS. 1 and 3. A conduit 15 is provided having fluid transfer tubing segments 49 and 50 carrying a circulating heat transfer fluid in opposite directions in a solar energy collection device. The tubes 49 and 50 extend in parallel alignment and are in communication with each other at their extreme right hand ends, as depicted in FIG. 3. A vacuum jacket 53 having spaced inner and outer walls 123 and 124 respectively is positioned about and encompasses the tubes 49 and 50. The walls 123 and 124 of the vacuum jacket 53 define an evacuated enclosure 125 therebetween. The fluid transfer tubes 49 and 50 are located within the interior confines defined by the inner wall 123 and the transverse end closures 45 and 47 within an insulation space 54.

Figure 2:
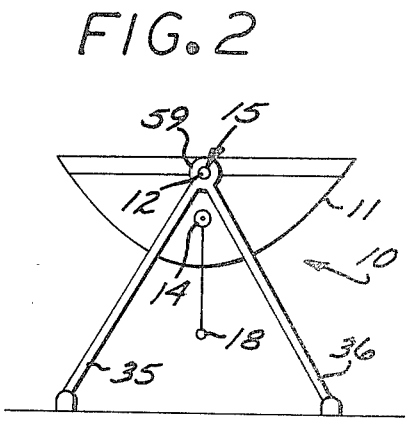
FIG. 2 illustrates a parabolic concentrator system in which the improved conduit of the invention is utilized.

The conduit 15 can be used in conjunction with a focusing parabolic concentrator, as depicted in FIG. 2. The illustration of FIG. 2 depicts a solar energy collection device 10 having a linearly extending reflector trough 11 with a highly reflective interior surface which is of uniform concave ruled parabolic cross section throughout. The reflector trough 11 is oriented to receive and concentrate solar radiation on the metal fluid transfer tube sections 49 and 50 of the conduit 15. The conduit 15 is located at the parabolic focal axis 12 of the trough 11.

Within the conduit 15, a first inner copper tube 49 is provided to carry fluid from one end of the trough 11 to the other along the parabolic focal axis 12. The second copper tube 50 has a blackened outer surface and is coaxially positioned about the first tube 49 and is in communication therewith at a single end of the trough, as depicted at the extreme righthand end in FIG. 3. This end is preferably elevated during use. Thus, the tube 49 carries a heat collection medium such as water, in a first longitudinal direction to the right in FIG. 3. The semicircular outer tube 50 carries the fluid back along the outside of the inner tube 49 in an opposite longitudinal direction to the left in FIG. 3. Relatively cool fluid enters the central inner tube 49 through an axial inlet port 51 and is withdrawn through an outlet port 52 in communication with the second or outer tube 50. Alternatively, fluid could be introduced through the port 52 and circulate through the outer tube 50 before entering the inner tube 49 at the elevated end of the trough 11. The fluid would then be withdrawn through the port 51.

In addition to the two tubes for circulating the heat collection medium, a vacuum jacket 53 is provided and is coaxially positioned about the tube 50 to minimize radiant heat loss therefrom. The volumetric area indicated at 54 is a dead air space surrounded by the interior wall of the cylindrical inner glass sleeve 123 and the transverse end closures 45 and 47. An outer cylindrical glass sleeve 124 is coaxially positioned about the inner sleeve 123 to define an annular evacuated volume 125 therebetween. The sleeves 123 and 124 are longitudinally elongated to a length commensurate with the length of the tube sections 49 and 50. The sleeves 123 and 124 may be joined together at each end at junctions shaped in the form of opposing halves of a torus, as depicted in FIG. 3. The extremities of the sleeves 123 and 124 may be sealed together to define the annular evacuated chamber 125 which encircles the tube segments 49 and 50.

Figure 1:
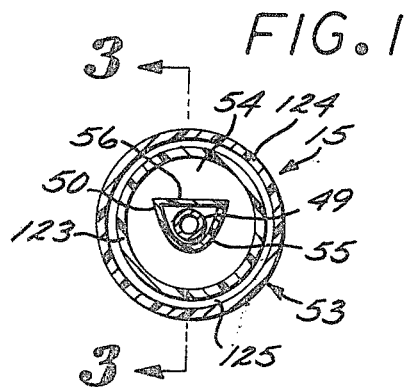
FIG. 1 is a cross sectional view of one form of the conduit of the invention.

The benefit derived from the conduit configuration depicted in FIG. 1 is that while radiant energy entering the semi-cylindrical surface 55 of the outer tube 50 is maximized, by striking the surface at substantially a 90° angle, the radiant energy, once transmitted to the heat collection fluid within the tubes 49 and 50, is trapped therein. That is, thermal energy is able to radiate from the heat collection conduit from the outer tube 50 through the dead air space 54 and through the evacuated enclosure 125 to only a slight degree and with great difficulty. To the contrary heat radiated from the inner tube 49 is absorbed in the outer tube 50, thus further minimizing overall heat loss in the flow of fluid circulating through the tubes 49 and 50. When utilized in conjunction with the solar concentrator of FIG. 2, the semicircular surface 55 of tube 50 faces the concave reflector surface of the trough 11 while the opposing flat surface 56 is parallel to the directrix of parabolic configuration, indicated at 18.

In the embodiment of FIG. 2, the conduit 15 is held in position by a felt packing which conforms to the outer surface of the sleeve 124. The felt packing thereby enables the conduit 15 to be centrally located within a bearing race. The bearing race and the conduit 15 rotate in synchronism with the reflector trough 11. The bearing race is carried in a bearing housing 59 which is welded to the upper extremities of stanchions 35 and 36 at the lower end of the solar collection mechanism 10. A similiar bearing assembly is employed at the upper or elevated end of the trough 11, but it is to be understood that the tubes The vacuum jacket 53 is coaxially positioned externally about the outermost of the pair of metal fluid transfer tube segments 49 and 50 in spaced relationship therefrom to minimize radiant heat loss. Other conduit configurations are quite acceptable for some purposes, however. For example, FIG. 7 discloses an arrangement in which a plurality of conduits 15' are disposed in lateral displacement from each other across the surface of a flat plate collector, such as the collector 20 depicted in FIG. 6. In this arrangement, a series of vacuum jackets 53 are provided with end terminations along one edge of the flat plate collector 20 in the end termination configuration of FIG. 8. At the opposite edge of the flat plate collector 20 elongated U-shaped tubes 60 enter and leave the collector panel. These tubes each include an elongated inlet segment 61 and a similiar parallel elongated outlet segment 62 joined at one end to the segment 61. Heat transfer fluid enters the conduit 15' through the tube segment 61, traverses the length of the conduit segment 15' and is received in the outlet tube segment 62, from which it leaves the collector panel at the same edge at which it entered.

The vacuum jacket 53 defines an evacuated chamber 125 as hereinbefore described. However, the tube segments 61 and 62 are not coaxially oriented relative to the vacuum jacket 53. Instead, the inlet tube 61 is joined along its length to a semi-cylindrical heat absorbing sheet 63 which delineates the lower portion of the dead air space 54' defined within the interior surface of the glass sleeve 123. The heat absorbing sheet 63 receives reflected radiation from the corrugations or toughs 64 of the corrugated aluminum sheet 65 located beneath the conduits 15' within the collector panel 20. Heat is thereby maintained within the dead air space 54' and transmitted to the heat collection fluid flowing through the parallel elongated tube segments 61 and 62.

The linearly extending reflector surfaces 64 are positioned externally of the conduits 15' to reflect solar radiation towards the vacuum jackets 53 to promote concentration and collection of solar energy. While depicted in semicircular form, it is to be understood that the reflector troughs 64 can assume a variety of configurations. An arcuate corrugated form is depicted as representing a suitable economic balance between cost of manufacture and efficiency of solar radiation collection in a flat plate collector 20. It is to be understood that alternative forms, such as V-shaped reflector troughs and parabolic reflectors are also quite suitable for use in flat plate collectors.

Figure 4:
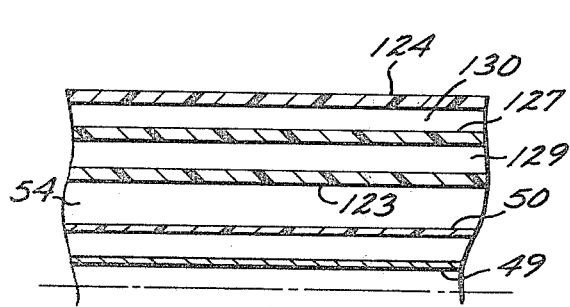
FIG. 4 is a sectional elevational view of the construction of an alternative embodiment of the invention.

FIG. 4 depicts an alternative embodiment of the invention in which the vacuum jacket includes an intermediate partion 127 between the spaced inner and outer glass sleeves 123 and 124. The partition 127 thereby divides the evacuated enclosure into a pair of concentric vacuum chambers denoted as an inner evacuated chamber 129 and an outer evacuated chamber 130. The use of such multiple layers of glass finds particular utility when the temperatures within the heat circulating fluid exceed 800° F. At such elevated temperatures, radiant heat loss becomes an increasingly important factor. Accordingly, the provision of a plurality of concentric surrounding evacuated enclosures represents a considerable savings in conservation of thermal energy within the heat circulating fluid. The use of plural evacuated chamber sections should be balanced against the loss in heat transmission through the walls formed by the concentric glass cylinders 123, 127, and 124, however. With each additional layer of glass, a loss of radiant energy collection of approximately 10% occurs. Accordingly, the suitability for the embodiment of the invention of FIG. 4 should be empirically derived for particular solar energy collection system configurations.

Figure 5:
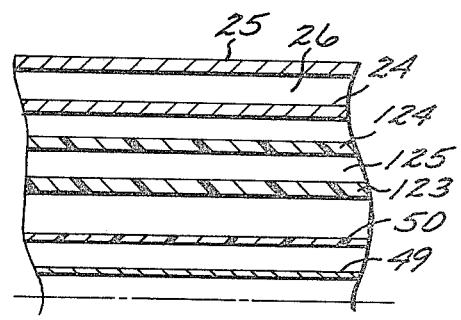
FIG. 5 is a sectional elevational view depicting an armored portion of a conduit according to the invention.
Figure 6:
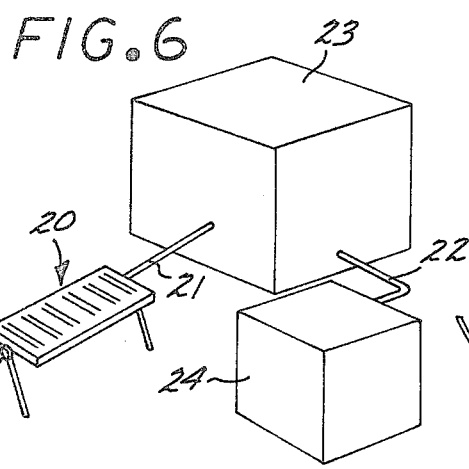
FIG. 6 is a perspective view illustrating the interconnection of armored portions of the conduit of the invention in flat plate collection system.
Figure 7:
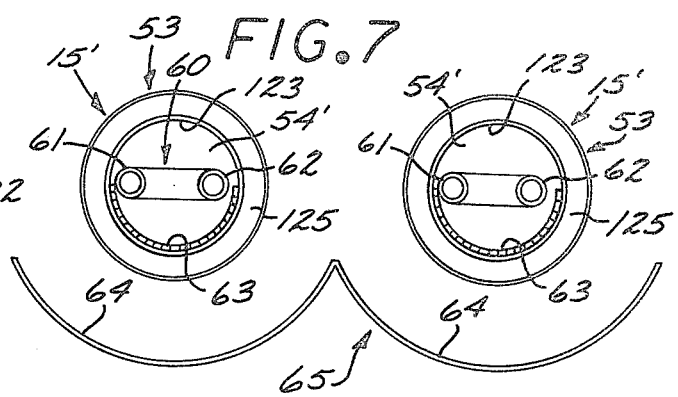
FIG. 7 is a cross sectional view of an alternative embodiment of the invention as disposed in a flat plate collector such as that of FIG. 6.

Still another embodiment of the invention embodies separate vacuum jacketed conduit sections extending internally within a solar radiation receiving section, such as within the solar collection panel 20 of FIG. 6, and also conduits that extend externally thereof, as indicated at 21 and 22 in FIG. 6. In the embodiment of FIG. 6, fluid is transferred from the solar collection panel 20 to a thermal sink indicated generally at 23. When a demand for heat arises, the heat transfer fluid is passed through a conduit section indicated at 22 to a heat exchanger 24. The use of vacuum jacketed conduits in which fluid flows within tubing separated from surrounding vacuum jackets by a dead air space serves to minimize heat loss in the transfer of the circulating fluid throughout the entire system. Preferably, however, the conduits are armored externally of the solar energy receiving station. With specific reference to FIG. 5, it can be seen that the armored portions 21 and 22 of the conduits of the invention may be formed with multi-walled metal tubing, which may be formed of any conventional structural metal, such as steel or copper. Between the exterior cylindrical metal sheathing 25 and the interior metal sheathing 24, a further evacuated region 26 is defined. No consideration need be given to the solar radiation absorption characteristics of the armored portions 21 and 22 of the conduit of the invention, as these portion will exist only externally of the solar energy receiving station. Consequently, the additional metal walls 24 and 25 serve not only to further minimize the loss of radiant energy by providing an additional vacuum enclosure 26, but also help to protect the conduit sections 21 and 22 from accidental damage. Such damage can easily occur during maintenance operations, during positioning of the apparatus or by intermeddling which might result at unattended locations.

The significance of the insulation space 54 surrounding the metal tubing in all of the embodiments of the invention is extremely important. While vacuum jackets have previously been used in association with solar energy collection devices in which an evacuated chamber was defined immediately externally of the fluid conducting tubes, there has heretofore been no provision of a dead air space enclosing heat transfer fluid conducting tubes within the confines of a vacuum jacket. Such an arrangement not only provides an additional thermal insulating medium to maintain heat within the circulating fluid, but also circumvents the requirement for effectuating glass to metal seals in association with the provision of evacuated chambers. Such seals have consistently failed to yield satisfactory results, and the elimination of the requirement for such seals by the invention herein allows solar energy collection systems to be operated with far less maintenance and servicing than has heretofore been possible.

It is to be understood that the various embodiments of the improved solar energy collection heat transfer conduits depicted herein are illustrative only, and are not intended to be complete. Various modifications and alterations of the invention will undoubtedly occur to those familiar with solar energy collection. Accordingly, the scope of the invention is defined in the claims appended hereto.

I claim:
1. In a solar energy collection device in which a circulating fluid is employed to collect and transfer solar energy, the improvement comprising:
   fluid transfer tube means having a first segment carrying fluid flow in a first direction and a second segment carrying fluid flow in an opposite direction and in communication with said first segment at one end thereof and proximately positioned parallel relative thereto,
   a glass vacuum jacket of elongated toroidal configuration having coaxial spaced inner and outer walls defining an evacuated cylindrical enclosure therebetween positioned about and encompassing said fluid transfer tube means and transverse end closure means at both ends of said inner wall which, together with said inner wall of said vacuum jacket, define a dead air insulation space within the confines of said inner vacuum jacket wall and encompassing said fluid transfer tubes, and
   support means coupled at both ends both to said tube segments and to said vacuum jacket.

2. The solar energy collection device of claim 1 further comprising at least one upwardly facing linearly extending reflector trough located beneath said vacuum jacket and said fluid transfer tube means to focus reflected solar energy for collection by fluid flowing within said fluid transfer tube means.

3. The solar energy collection device of claim 1 further characterized in that said vacuum jacket comprises at least one pair of linearly extending coaxial glass cylinders.

4. The solar energy collection device of claim 1 further characterized in that said vacuum jacket includes an intermediate partition between said spaced inner and outer walls thereby dividing said evacuated enclosure into a pair of concentric vacuum chambers.

5. The solar energy collection device of claim 1 further characterized in that said fluid transfer tube means and said vacuum jacket extend both through a solar radiation receiving section and to a thermal sink, thereby minimizing heat loss in the transfer of said circulating fluid.

6. The solar energy collection device of claim 1 further characterized in that said fluid transfer tube means extends both through a solar radiation receiving section and to a heat exchanger, thereby minimizing heat loss in the transfer of said circulating fluid.

7. The solar energy collection device of claim 6 further characterized in that said vacuum jacket is armored by cylindrical metal sheathing between said solar radiation receiving section and said heat exchanger, and said sheathing is evacuated to further minimize loss of radiant energy.

8. The solar energy collection device of claim 8 further characterized in that the armored portion of said vacuum jacket is formed of multiple walled steel tubing.

9. The solar energy collection device of claim 8 further characterized in that the armored portion of said vacuum jacket is formed of multiple walled copper tubing.

10. The solar energy collection device of claim 6 further characterized in that said linearly extending reflector is a parabolic trough formed with a uniform concave ruled surface of parabolic cross section and orientated to receive and concentrate solar radiation on said metal fluid transfer tube segments and the semicircular outer surface of the curved portion of the outermost of said metal fluid transfer tube segments faces said uniform concave surface of said trough, and an opposing flat portion of said outermost of said metal fluid transfer tube segments is parallel to the directrix of said parabolic configuration.

11. The solar energy collection apparatus of claim 10 further characterized in that said pair of metal fluid transfer tubes and said vacuum jacket are concentric about the parabolic focal axis of said trough.

12. A linearly extending solar energy collection apparatus carrying a solar energy collection and heat transfer fluid comprising:
   a pair of metal fluid transfer tube segments linearly extending in spaced parallel relationship to receive solar radiation and joined at one end in a serial fluid transfer connection, whereby said fluid flows within said tube segments in opposite directions,
   a glass vacuum jacket of elongated toroidal configuration having a cylindrical interior wall laterally encompassing said pair of metal fluid transfer tube segments and transverse end closure means extending across the area enclosed by said interior wall at both ends thereof to define an elongated volume of dead air and
   end support means coupled at both ends both to said tube segments and to said vacuum jacket.

13. The solar energy collection apparatus of claim 12 further characterized in that said metal tube segments are formed of copper and an air tight seal is disposed therebetween with said vacuum jacket to inhibit the circulation of air within said volume of air.

14. The solar energy collection apparatus of claim 12 wherein one of said metal tube segments of said pair of metal fluid transfer tube segments is coaxially positioned about the other of said metal tube segments, whereby fluid flows in the outermost of said coaxial tubes along the outside of said inner tube segment in an opposite longitudinal direction relative to fluid flow within said inner tube segment.

15. The solar energy collection apparatus of claim 14 wherein said vacuum jacket is coaxially positioned externally about the outermost of said pair of metal fluid transfer tube segments in spaced relationship therefrom to minimize radiant heat loss.

16. The solar energy collection device of claim 12 further characterized in that a linearly extending reflector is positioned externally of said tube segments to reflect solar radiation toward said vacuum jacket to effectuate concentration and collection of solar radiation as thermal energy in said fluid flowing within said pair of metal fluid transfer tube segments.

17. The solar energy collection apparatus of claim 16 further characterized in that said metal fluid transfer tube segments are positioned in coaxial relationship and said vacuum jacket is likewise positioned coaxially about said metal fluid transfer tube segments in spaced relationship therefrom, and the outermost of said metal fluid transfer tube segments has a semicircular outer surface, the curved portion of which faces said linearly extending reflector.

18. The solar energy collection apparatus of claim 12 further characterized in that said glass vacuum jacket is shaped as a pair of longitudinally extending cylinders of a length commensurate with the length of said tube sections and joined together at each end.

19. The solar energy collection apparatus of claim 12 further characterized in that said glass vacuum jacket is shaped as a pair of concentric glass tubes.

20. The solar energy collection apparatus of claim 19 further characterized in that at one end of said vacuum jacket said glass tubes are closed in concentric fashion to encircle said tube segments throughout their lengths and cap them at the aforesaid one end.

* * * * *

UNITED STATES PATENT AND TRADEMARK OFFICE
CERTIFICATE OF CORRECTION

PATENT NO. : 4,186,724
DATED : February 5, 1980
INVENTOR(S) : David H. Nelson

It is certified that error appears in the above-identified patent and that said Letters Patent are hereby corrected as shown below:

At column 5, line 42 change the comma to a period and delete the remainder of the line following "trough 11."

Signed and Sealed this

Third Day of June 1980

[SEAL]

Attest:

Attesting Officer

SIDNEY A. DIAMOND

Commissioner of Patents and Trademarks